(12) United States Patent
Clephas et al.

(10) Patent No.: US 7,950,732 B2
(45) Date of Patent: May 31, 2011

(54) ROOF ASSEMBLY FOR A VEHICLE AND METHOD OF OPERATING SAME

(75) Inventors: Petrus Martinus Josephus Clephas, Sevenum (NL); Michael Cornelis Anthonius Relouw, Merselo (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 12/408,889

(22) Filed: Mar. 23, 2009

(65) Prior Publication Data

US 2009/0243344 A1 Oct. 1, 2009

(30) Foreign Application Priority Data

Mar. 26, 2008 (EP) .................................... 08102938

(51) Int. Cl.
*B60J 7/05* (2006.01)

(52) U.S. Cl. ...................................... 296/213; 296/221

(58) Field of Classification Search .................. 296/213, 296/221

See application file for complete search history.

(56) References Cited

U.S. PATENT DOCUMENTS

| | | | |
|---|---|---|---|
| 4,664,439 A * | 5/1987 | Schaetzler et al. ............ 296/213 |
| 4,883,311 A | 11/1989 | Kohlpaintner | |
| 6,073,994 A | 6/2000 | Jardin | |
| 6,942,283 B2 * | 9/2005 | Wilms .......................... 296/213 |
| 2004/0189056 A1 | 9/2004 | Wilms | |
| 2006/0091703 A1 | 5/2006 | Huijer | |

FOREIGN PATENT DOCUMENTS

| | | | |
|---|---|---|---|
| DE | 3905985 | * 9/1990 | ................... 296/213 |
| DE | 20320515 | 11/2004 | |
| DE | 102004042416 | 3/2006 | |
| EP | 0317730 | 5/1989 | |
| EP | 0856424 | 8/1998 | |
| EP | 1264723 | 11/2002 | |
| EP | 1442907 | 8/2004 | |
| WO | WO 2007/118468 | 10/2007 | |

OTHER PUBLICATIONS

Official Search Report of the European Patent Office in counterpart foreign application No. 08102938.1 filed Mar. 26, 2008.

* cited by examiner

*Primary Examiner* — Dennis H Pedder
(74) *Attorney, Agent, or Firm* — Steven M. Koehler; Westman, Champlin & Kelly, P.A.

(57) ABSTRACT

A roof assembly comprises a closure moveable at least between a closed position closing the roof opening in the fixed roof of the vehicle and an open position in which the closure is slid under the fixed roof and at least partially opening the roof opening. A drain channel is positionable under the rear edge of the roof opening at least in a closed position of the closure. A drain channel operating mechanism is adapted to cause a vertical movement of the drain channel on the one hand and adapted to move said drain channel in the opening direction of the closure on the other hand. The drain channel operating mechanism is adapted to allow a relative movement between the drain channel and the closure during at least a part of the sliding movement of the closure. The drain channel operating mechanism includes a spring member acting upon the drain channel to keep the drain channel in engagement with a rear part of the closure in a vertical direction at least when the closure is in the open position. The drain channel and the closure are adapted to be in sliding engagement during relative movement between the drain channel and the closure.

20 Claims, 6 Drawing Sheets

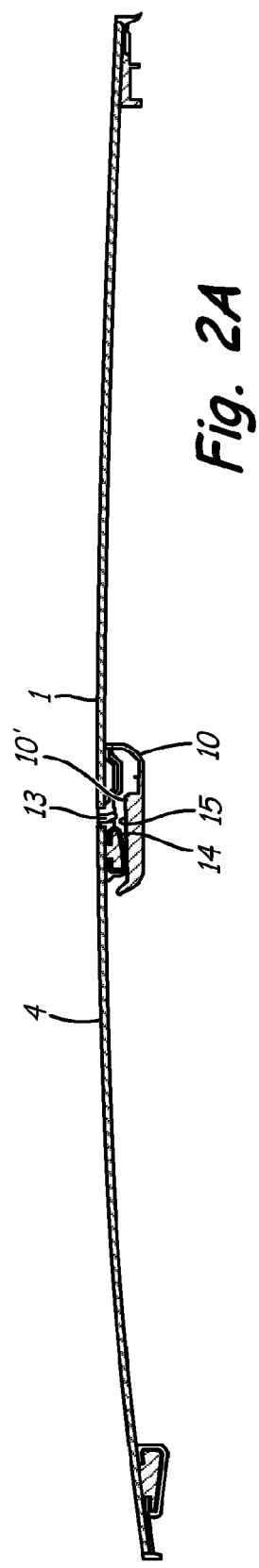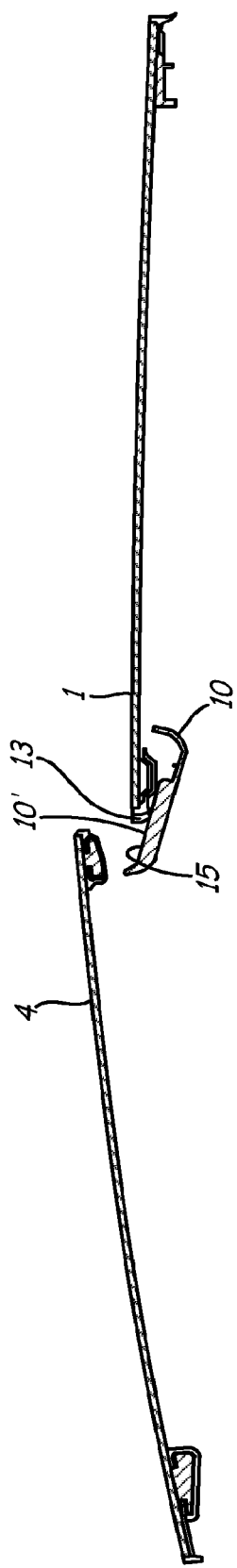

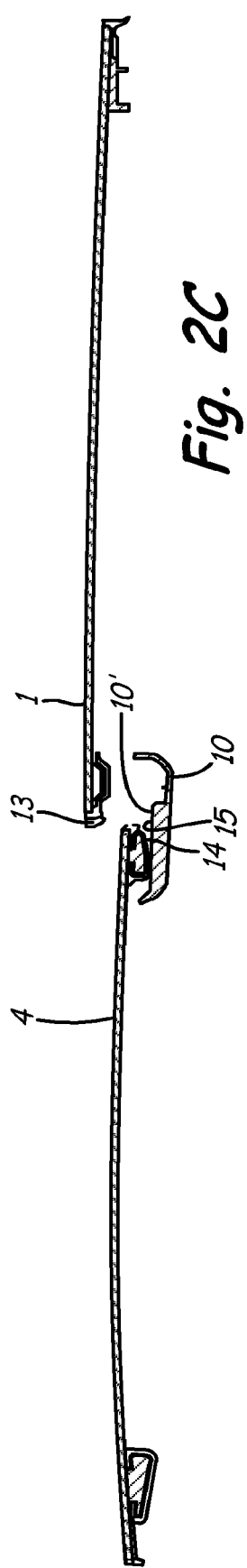
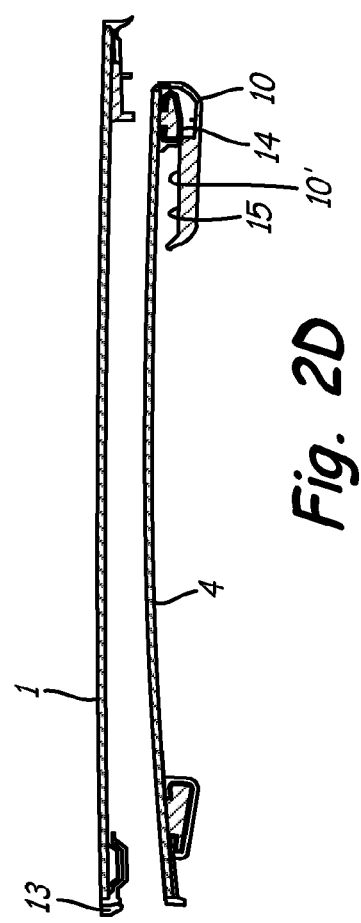

ROOF ASSEMBLY FOR A VEHICLE AND METHOD OF OPERATING SAME

BACKGROUND

The discussion below is merely provided for general background information and is not intended to be used as an aid in determining the scope of the claimed subject matter.

Roof assemblies for vehicles having drain channels positionable under the rear edges of the roof openings are known in the art. For example, one such roof assembly is known from EP 1 442 907. In this prior art roof assembly the drain channel is supported on a complicated drain channel operating mechanism with a forced vertical movement. It has a lost motion provision to allow for a relative horizontal movement between the drain channel and the closure panel at the beginning or end of the opening movement of the panel.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

One aspect of the present invention is a roof assembly for a vehicle having a roof opening in its fixed roof. The roof assembly includes a stationary part comprising longitudinal guide sections positionable on either side of the roof opening. A closure for the roof opening is moveable at least between a closed position to close the roof opening and an open position in which the closure is slid under the fixed roof and at least partially opens the roof opening. A closure operating mechanism is provided to open and close the closure, while a drain channel is positionable under the rear edge of the roof opening at least in a closed position of the closure. A drain channel operating mechanism is adapted to cause a vertical movement of the drain channel on the one hand and adapted to move the drain channel in the opening direction of the closure on the other hand. The drain channel operating mechanism is adapted to allow a relative movement between the drain channel and the closure during at least a part of the sliding movement of the closure. The drain channel operating mechanism includes spring to act upon the drain channel to keep the drain channel in engagement with a rear part of the closure in vertical direction at least when the closure is in the open position. In addition, the drain channel and the closure are adapted to be in sliding engagement during relative movement between the drain channel and the closure.

The spring is a simple device for creating a high position of the drain channel in higher positions of the closure, for example the closed position. Due to the sliding engagement of the drain channel and the closure, it is still possible to provide for a relative horizontal movement between the closure and the drain channel with a relatively simple device.

When the closure operating mechanism is adapted to move the closure from the closed position in the roof opening to a venting position with the rear end of the closure above the rear edge of the roof opening, it is favorable if the drain channel is supported such that it is tiltable about a transverse axis and is in tilted engagement with the rear edge of the roof opening when the closure is in the venting position. It is then even possible to tilt the drain channel such that the front edge of the drain channel is at a higher level than the upper surface of the fixed roof. This allows the drain channel to catch water from the roof also in dynamic conditions, for example if the car brakes suddenly and water on the fixed roof behind the roof opening is thrown forwardly.

One way of allowing the drain channel to move upwardly and to tilt is by supporting the drain channel pivotally on one end of a lever which is pivotally connected on its other end on a drain channel slide. The spring may act between the drain channel slide and the lever and/or between the lever and the drain channel.

In one embodiment the closure operating mechanism is connected to each of said drain channel slides by means of a lost motion device, possibly under spring pressure from a spring biasing the drain channel slide rearwardly with respect to the closing operating mechanism. This lost motion device can include a stop attached to the longitudinal guide section and co-operating with the drain channel or the slide supporting it, such as near the maximum rearwardly displaced position of the closure.

This lost motion device enables the drain channel to stop before the closure reaches its fully opened position, thereby limiting the rearward extent of the roof assembly. This is obtained by simple but effective device.

It is favorable if the drain channel is provided with one or more engagement surfaces and the closure is provided with one or more sliders adapted to engage the engagement surface(s), so that a sliding engagement can be created in one or more discrete positions, which hardly influences the appearance of the closure and hardly influences the effectiveness of the drain channel to catch water.

Another aspect of the present invention includes a method of operating the roof assembly.

BRIEF DESCRIPTION OF THE DRAWINGS

Further details and advantages of the roof assembly according to the invention appear from the following description of the attached drawings showing an embodiment of the invention by way of example.

FIG. 2A-2D are very schematic side elevational views of the roof assembly of the invention showing the principal movements of the closure and drain channel.

DETAILED DESCRIPTION OF THE ILLUSTRATIVE EMBODIMENT

Figure 1:
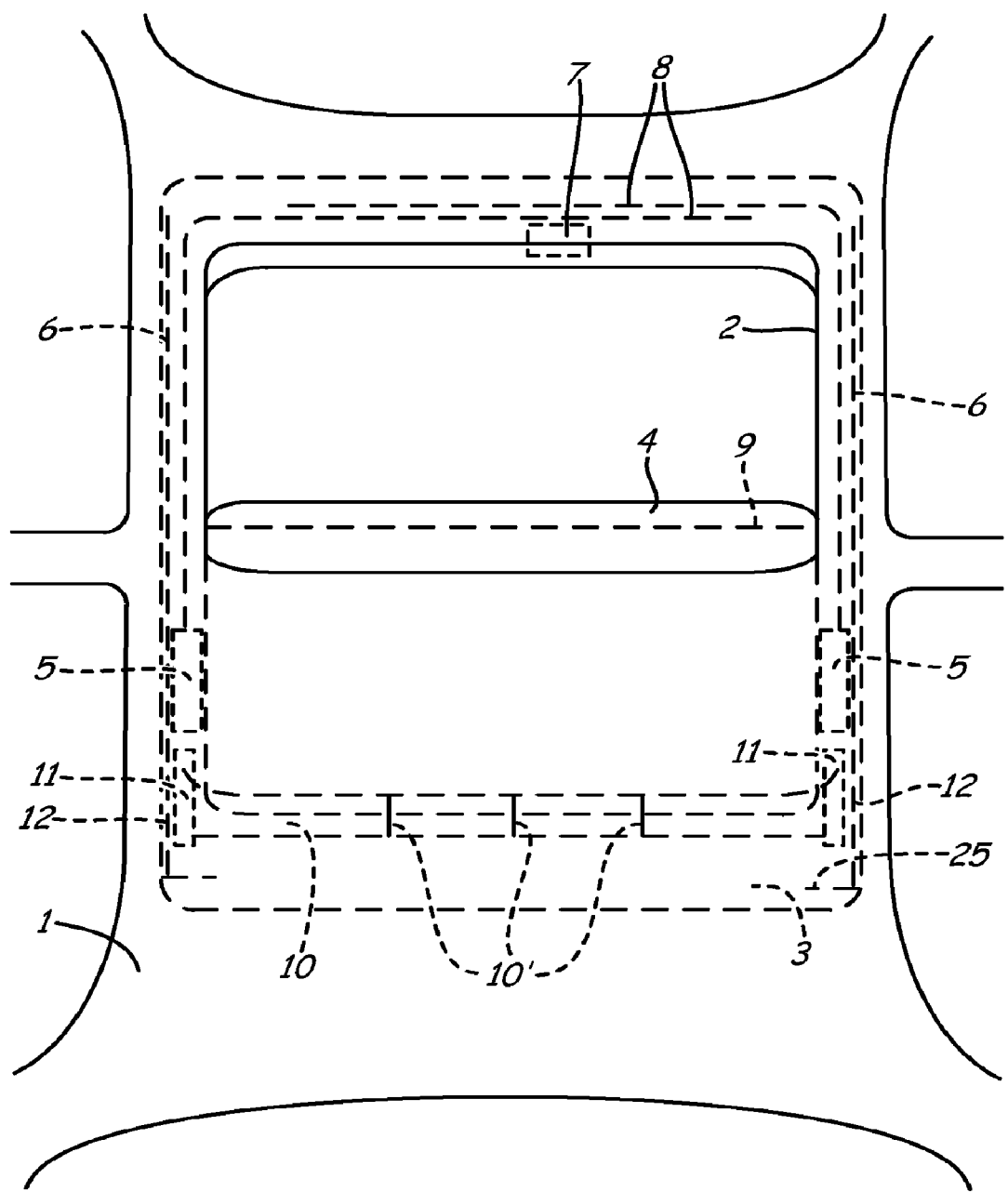
FIG. 1 is very schematic plan view of a vehicle roof fitted with the embodiment of the roof assembly according to the invention.

FIG. 1 shows the fixed roof 1 of a motor vehicle, by way of example, a passenger car. This fixed roof 1 is provided with an opening 2 having a substantially rectangular shape, which is provided for the purpose of mounting a roof assembly therein. The roof assembly is provided with a stationary part, in this case a stationary frame 3, which is secured against the underside of the fixed roof 1 of the vehicle. It is also possible that at least a part of the fixed roof of the vehicle is replaced by fixed roof panel(s) of the roof assembly.

In the illustrated embodiment, the roof assembly is a so called tilt-sliding roof which comprises a more or less rigid, possibly transparent panel 4 as the closure, which panel is capable of selectively closing the roof opening 2 or opening it to a greater or lesser degree. To this end, panel 4 is laterally supported by closure operating mechanisms 5 which are slidably accommodated in longitudinal guide sections 6 mounted on frame 3 or forming part thereof, which extend in longitudinal direction from either side of the roof opening 2 and rearwards thereof, in parallel relationship to each other. The mechanisms 5 can be moved synchronously in the guide sections 6, moving the panel 4 not only in longitudinal direction, but also in vertical direction. The mechanisms 5 are operated from a driving device 7, such as an electric motor, for example via pull-push cables 8.

Besides panel 4, the roof assembly may also comprise a second closing element in the form of a sun screen 9, which is slidably guided with its side edges in the guide sections 6. The sun screen 9 can be moved forwards or backward by hand or be carried along by the panel 4.

The roof assembly is provided with a water drain which functions to catch water that may seep through or between panel 4 and the fixed roof 1, or which may otherwise drain over the rear edge (relative to forward motion of the vehicle) of the roof opening 2 or the edges of the panel 4. FIG. 1 shows a transversely extending movable drain channel 10. This drain channel 10 is positioned under the rear edge of the roof opening 2 in the closed position of the panel 4, and it will move along with panel 4 when the panel 4 moves in a rearward direction. To this end, the drain channel 10 is mounted with its end on drain channel slides 11 connected to the mechanism 5. Outwardly thereof, or in the outer parts of the guide sections 6, a respective stationary lateral drain channel 12 is present, above which the respective ends of the movable drain channel 10 debouches for draining the water that has been caught in drain channel 10. From the drain channels 12 the water can be drained to the outside of the vehicle, for example via drain pipes and hoses.

FIGS. 2A-2D show very schematically four different positions of the panel 4 and corresponding positions of the drain channel 10.

In FIG. 2A the panel 4 is shown in its closed position in the roof opening 2. The drain channel 10 is positioned partly below the rear edge of the panel 4 and partly below the fixed roof 1, so that a seal 13 between panel 4 and the fixed roof 1 is positioned near the center of the drain channel 10. The front and rear upper edges of the drain channel 10 are in engagement with the panel 4 and the fixed roof 1, respectively.

In FIG. 2B the panel 4 has been moved to its venting position, in which the rear end of the panel 4 is positioned above the rear edge of the roof opening 2 so as to create a ventilating opening between the panel 4 and the fixed roof 1. In this position of the panel 4, the drain channel 10 remains below the rear edge of the roof opening 2, but has been tilted with its front edge upwardly so as to position the front edge at a higher level than the fixed roof 1. This enables the drain channel 10 to catch any water from the fixed roof 1, also when it has a greater speed, for example if the car suddenly brakes and water is present on the fixed roof 1 behind the roof opening 2. In this position, the drain channel 10 is in engagement with the fixed roof 1 which determines the highest position of the drain channel 10.

In FIG. 2C, the panel 4 has been moved from the closed position in the roof opening 2 with its rear end downwardly in order to be able to slide rearwardly below the fixed roof 1. In this "dropped" position of the panel 4 the drain channel 10 has been moved downwardly along with the rear end of the panel 4 so that the drain channel 10 is positioned at a lower level than in the closed position of the panel 4. The drain channel 10 is able to catch and drain water falling off the rear edge of the panel 4. The panel 4 has one or more sliders or slide pads 14 or other suitable downward facing projections or surfaces which are in engagement with a corresponding engagement surface 15 on the upper side of the drain channel 10. In the embodiment shown the drain channel 10 has three engagement surfaces in the form of longitudinal upstanding ribs 10' (FIG. 1) in and near the center of the drain channel 10, i.e. at the highest point of the drain channel 10.

In FIG. 2D, the panel 4 has been slid rearwardly below the fixed roof 1. The drain channel 10 has been moved along with the panel 4, however, the panel 4 has been displaced rearwardly with respect to the drain channel 10 during the rearward movement, so that the drain channel 10 hardly projects rearwardly beyond the panel 4. Therefore room is saved at the rear end of the frame 3. No space has to be available for accommodating the protruding drain channel 10 when the closure 4 is in its completely open position.

Figure 3A:
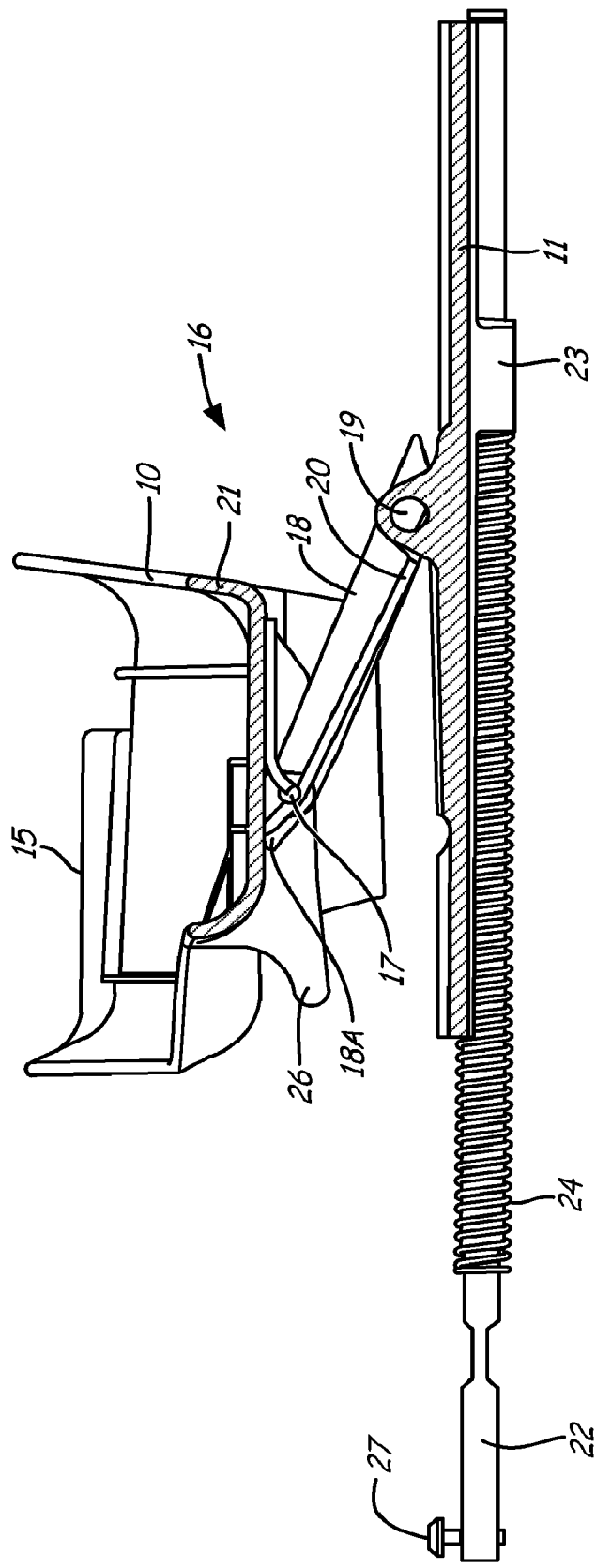
FIGS. 3*a*-3C are enlarged sectional views of the drain channel operating mechanism, in three different positions of the drain channel.
Figure 3B:
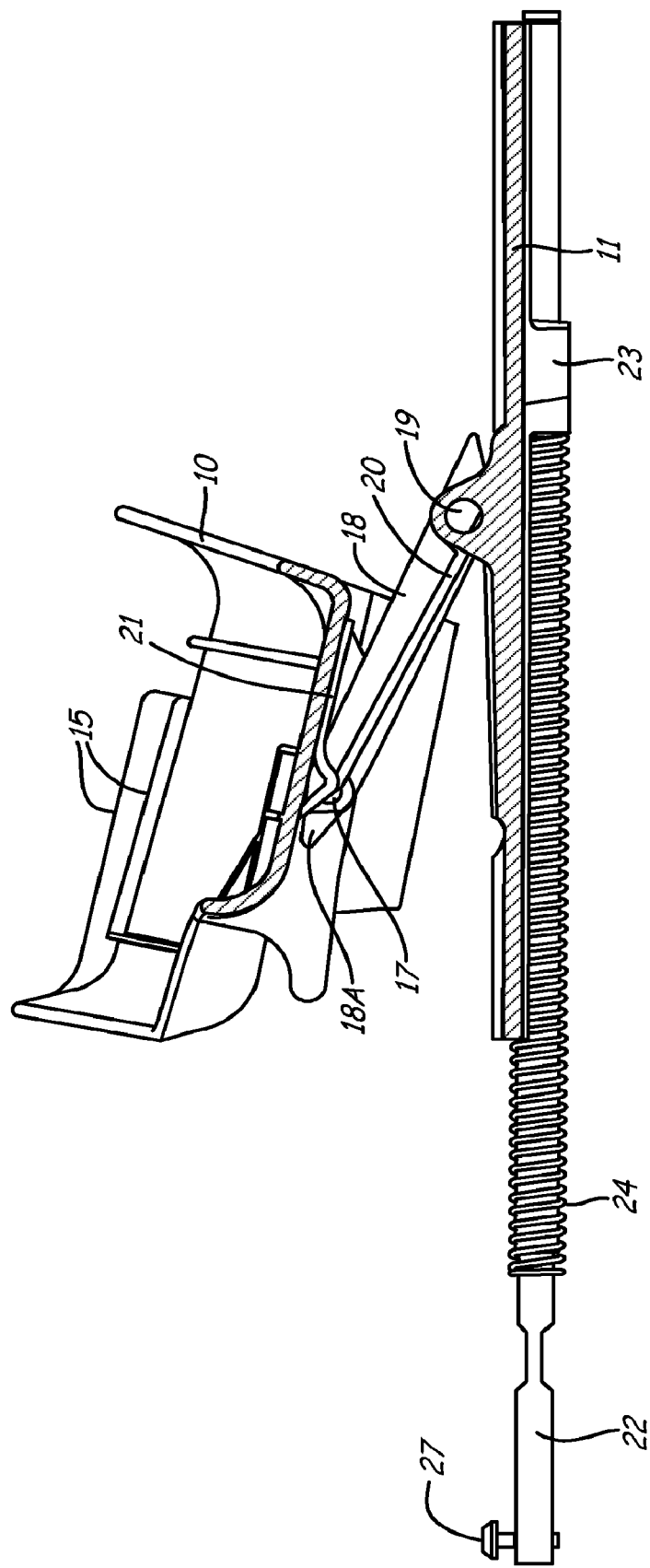
Figure 3C:
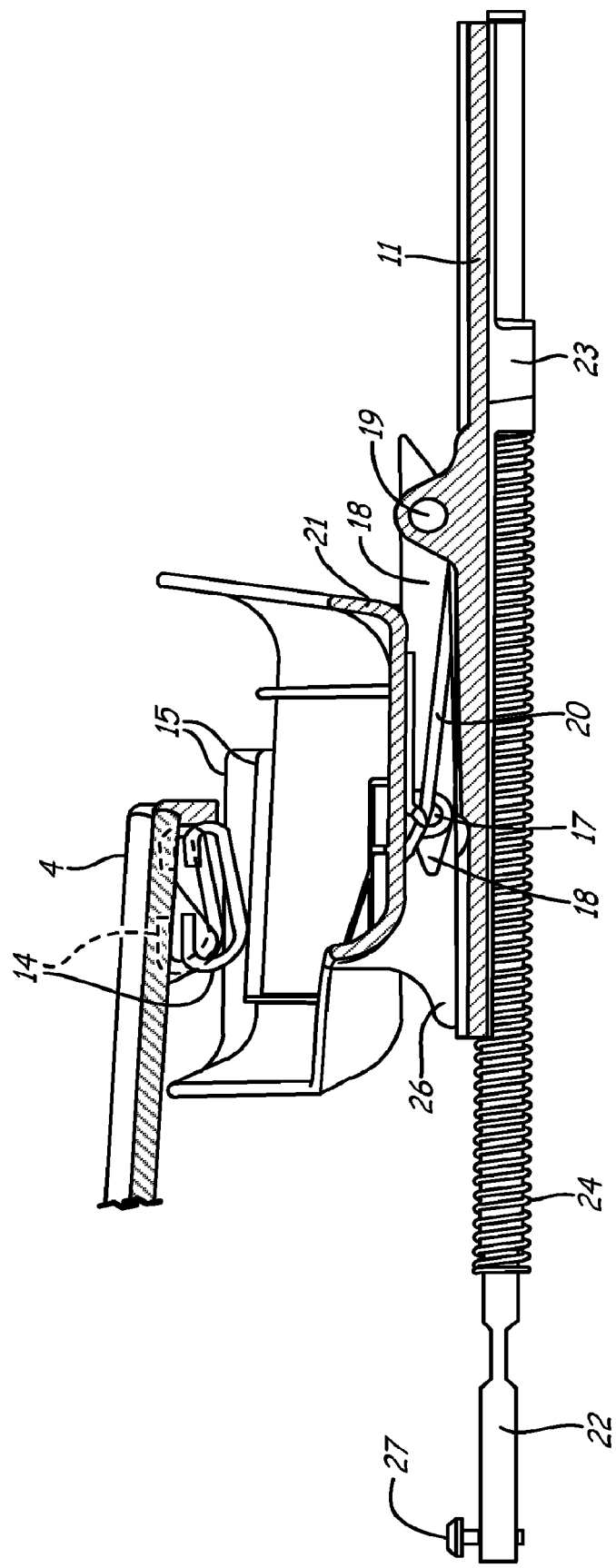

FIGS. 3A-3C show the drain channel 10 and a drain channel operating mechanism 16 on one side of the roof opening 2 in more detail. This drain channel operating mechanism 16 enables the drain channel 10 to move up and down and to tilt around a horizontal transverse axis 17. These movements are enabled by a lever 18 which pivotally supports the drain channel 10 on its upper end through the transverse axis 17, in this case formed by a pivot pin. The lever 18 is connected on its other (rear lower) end on the drain channel slide 11 through a transverse axis 19. A torsion spring 20 biases the lever 18 in an upward direction, and an extension 21 of said spring 20 engages the lower side of the drain channel 10, thereby biasing the drain channel 10 around the axis 17, so that the rear side of the drain channel 10 (the right side in FIG. 3) is biased in an upward direction. This upward rotation is limited by the shape of top 18A of lever 18, engaging the lower side of the drain channel 10

The drain channel operating mechanism 16 further includes a lost motion device, here comprising a pin 22 sliding in a guide 23 below the drain channel slide 11 and being provided with a pressure spring 24, here a helical spring wound around the pin 22 and biasing the drain channel slide 11 in rearward (relative to forward motion of the vehicle) direction (and pin 22 in forward direction). The lost motion device further includes a stop 25 (see FIG. 1) supported by the frame 3 or the guide section 6 and determining the rearmost position of the drain channel slide 11.

The pin 22 is connected to the closure operating mechanism 5 (represented by fastener 27), that is to a part thereof which has a fixed horizontal relationship with the panel 4. Due to the lost motion device, the pin 22 (and thus the panel 4) may travel further rearward while the drain channel slide 11 (and thus the drain channel 10) has already reached its rearmost position. During this relative displacement of the panel 4 and the drain channel 10, the panel sliders 14 slide along the engagement surfaces 15 of the drain channel 10 to maintain the drain channel 10 in its lower position, but allow the relative movement.

FIG. 3A shows the drain channel 10 in the position when panel 4 is in its closed position, corresponding with the position shown in FIG. 2A.

In FIG. 3B, the drain channel 10 is shown in its position when the panel 4 is in the venting position according to FIG. 2B. The spring 20 urges the drain channel 10 to this position in which it is in engagement with the fixed roof 1, against the spring force of spring extension 21.

FIG. 3C shows the position of the drain channel 10 corresponding to that of FIG. 2C in which the panel 4 has moved the drain channel 10 downwardly against the force of the spring 20, 21. The drain channel 10 is now in the lowermost position and the drain channel 10 is resting with a front support 26 on the upper side of the drain channel slide 11. In this position the drain channel 10 is allowed to move below the fixed roof 1 together with the panel 4 and the engagement surface 15 of the drain channel 10 allows the panel 4 to move with respect to the drain channel 10 when the stop 25 has stopped the movement of the drain channel slide 11 while the pin 22 and the panel 4 continue their rearward movement.

When the panel 4 is moved from the completely open position in a direction towards the closed position again, the spring 24 will keep the drain channel slide 11 in engagement with the stop 25 and the pin 22 will move forward until it takes along the slide 11 again.

From the foregoing it is clear that the invention provides a drain channel operating mechanism enabling a movement of the drain channel in longitudinal and vertical directions with respect to the closure and/or fixed roof by simple and reliable means.

Although the subject matter has been described in a language specific to structural features and/or methodological acts, it is to be understood that the subject matter defined in the appended claims is not necessarily limited to the specific features or acts described above as has been determined by the courts. Rather, the specific features and acts described above are disclosed as example forms of implementing the claims. As such, aspects of the invention may be varied in different manners within the scope of the invention. For example, it is possible that the closure engages the drain channel indirectly, as not directly as shown in the drawings. Either the closure and/or the drain channel may be provided with a part engaging the other. The drain channel may also be provided on the front edge of a closure if the closure can be opened on the front side. The roof assembly may include several closures.

What is claimed is:

1. A roof assembly for a vehicle having a roof opening in its fixed roof, the roof assembly comprising a stationary part including longitudinal guide sections positionable on either side of the roof opening, a closure moveable at least between a closed position closing the roof opening and an open position in which the closure is slid under the fixed roof and at least partially opening the roof opening, a closure operating mechanism coupled to the closure, the closure operating mechanism being manipulatable to open and close said closure, a drain channel positionable under the rear edge of the roof opening at least in a closed position of the closure, and a drain channel operating mechanism connected to the drain channel to cause a vertical movement of the drain channel and to move said drain channel in the opening direction of the closure, said drain channel operating mechanism allowing a relative movement between the drain channel and the closure during at least during a part of the sliding movement of the closure, wherein the drain channel operating mechanism includes a spring that acts upon the drain channel to keep the drain channel in engagement with a rear part of the closure in a vertical direction at least when the closure is in the open position, and in that the drain channel and the closure are in sliding engagement during relative movement between the drain channel and the closure, wherein the closure operating mechanism is connected to the closure to move the closure from the closed position in the roof opening to a venting position with the rear end of the closure above the rear edge of the roof opening, and wherein the drain channel operating mechanism moves the drain channel such that the drain channel is pivoted about a transverse axis and is in tilted engagement with the rear edge of the roof opening when the closure is in the venting position.

2. The roof assembly of claim 1, wherein each end of the drain channel is pivotally supported on one end of a lever which is pivotally connected on its other end on a drain channel slide which is slidable in one of said longitudinal guide sections, the spring biasing the drain channel in an upward direction.

3. The roof assembly of claim 2, wherein the spring includes a first spring portion biasing the lever upwardly and a second spring portion biasing the drain channel with its rear side in upward direction.

4. The roof assembly of claim 2, and further comprising a lost motion device connecting said closure operating mechanism to each of said drain channel slides.

5. The roof assembly of claim 4 wherein the lost motion device includes a spring that biases the drain channel slide rearwardly with respect to the closure operating mechanism.

6. The roof assembly of claim 4, wherein the lost motion device includes a stop attached to each of the longitudinal guide sections and co-operating with one of the drain channels and the slide supporting it.

7. The roof assembly of claim 6, wherein the stop is positioned proximate a maximum rearwardly displaced position of the closure.

8. The roof assembly of claim 6, wherein the drain channel slide is connected to the closure operating mechanism through a connecting element slidable with respect to the drain channel slide.

9. The roof assembly of claim 2, wherein the drain channel is provided with a plurality of engagement surfaces and the closure being provided with sliders that engage the engagement surfaces.

10. A roof assembly for a vehicle having a roof opening in its fixed roof, the roof assembly comprising:
    a stationary part including spaced apart longitudinal guide sections;
    a closure slidably engaging the spaced apart longitudinal guide sections and being positionable to open and close the roof opening;
    a closure operating mechanism coupled to the closure and connected to the closure to move the closure relative to the longitudinal guide sections;
    a drain channel for receiving water from a rear edge of the closure, wherein the drain channel and the closure are in sliding engagement during at least some relative movements between the closure and the drain channel;
    a drain channel operating mechanism for causing a vertical movement of the drain channel and for causing movement of said drain channel relative to the longitudinal guide sections in a direction corresponding to opening of the closure, said drain channel operating mechanism allowing a relative movement between the drain channel and the closure during at least a part of the sliding movement of the closure, wherein the drain channel operating mechanism includes a spring acting upon the drain channel to keep the drain channel in engagement with a rear part of the closure in a vertical direction at least when the closure is at a position relative to the longitudinal guides corresponding to the closure being in the open position, wherein the closure operating mechanism is connected to the closure to move the closure from a position corresponding to the roof opening being closed to a position corresponding to the closure being in a venting position where the rear edge of the closure is above a portion of the fixed roof, and wherein when the closure is in the venting position, the drain channel operating mechanism positions the drain channel in a position corresponding to a portion of the drain channel being positioned below a rear edge of the roof opening and tilts the drain channel so that another portion extends upwardly beyond the rear edge of the roof opening, the drain channel being pivotally coupled to the drain channel operating mechanism.

11. The roof assembly of claim 10, wherein each end of the drain channel is pivotally supported on one end of a lever which is pivotally connected on its other end on a drain channel slide which is slidable in one of said longitudinal guide sections, the spring biasing the drain channel upwardly.

12. The roof assembly of claim 11, wherein the spring includes a first spring portion biasing the lever upwardly and a second spring portion biasing a rear portion of the drain channel upwardly.

13. The roof assembly of claim 11, and further comprising a lost motion device connecting said closure operating mechanism to each of said drain channel slides.

14. The roof assembly of claim 13 wherein the lost motion device includes a spring that biases the drain channel slide rearwardly with respect to the closure operating mechanism.

15. The roof assembly of claim 13, wherein the lost motion device includes a stop attached to each of the longitudinal guide sections and co-operating with one of the drain channels and the slide supporting it.

16. The roof assembly of claim 15, wherein the stop is positioned proximate a maximum rearwardly displaced position of the closure.

17. The roof assembly of claim 15, wherein the drain channel slide is connected to the closure operating mechanism through a connecting element slidable with respect to the drain channel slide.

18. The roof assembly of claim 11, wherein the drain channel is provided with a plurality of engagement surfaces and the closure being provided with sliders that engage the engagement surfaces.

19. A roof assembly for a vehicle having a roof opening in its fixed roof, the roof assembly comprising:
   a stationary part including spaced apart longitudinal guide sections;
   a closure slidably engaging the spaced apart longitudinal guide sections and being positionable to open and close the roof opening;
   a closure operating mechanism coupled to the closure and connected to the closure to move the closure relative to the longitudinal guide sections;
   a drain channel for receiving water from a rear edge of the closure;
   a drain channel operating mechanism attached to the drain channel, the drain channel operating mechanism comprising two spaced apart pivots aligned with a transverse axis of the closure, wherein the drain channel operating mechanism causes a vertical movement of the drain channel and a tilting movement of the drain channel, and wherein the drain channel and the closure are in sliding engagement during at least some relative movements between the closure and the drain channel.

20. A roof assembly for a vehicle having a roof opening in its fixed roof, the roof assembly comprising:
   a stationary part including spaced apart longitudinal guide sections;
   a closure slidably engaging the spaced apart longitudinal guide sections and being positionable to open and close the roof opening;
   a closure operating mechanism coupled to the closure and connected to the closure to move the closure relative to the longitudinal guide sections;
   a drain channel for receiving water from a rear edge of the closure;
   a drain channel operating mechanism attached to the drain channel, the drain channel operating mechanism comprising two spaced apart pivots aligned with a transverse axis of the closure, wherein the drain channel operating mechanism causes a vertical movement of the drain channel and a tilting movement of the drain channel, wherein when the closure operating mechanism is connected to the closure to move the closure from the closed position in the roof opening to a venting position with the rear end of the closure above the rear edge of the roof opening, the drain channel operating mechanism moves the drain channel such that the drain channel is pivoted about the transverse axis and is in tilted engagement with the rear edge of the roof opening when the closure is in the venting position.

* * * * *

UNITED STATES PATENT AND TRADEMARK OFFICE
CERTIFICATE OF CORRECTION

PATENT NO. : 7,950,732 B2  
APPLICATION NO. : 12/408889  
DATED : May 31, 2011  
INVENTOR(S) : Clephas et al.

Page 1 of 1

It is certified that error appears in the above-identified patent and that said Letters Patent is hereby corrected as shown below:

Column 6,
Line 26, delete "claim 2" and insert -- claim 1 --.

Signed and Sealed this
Twenty-first Day of February, 2012

David J. Kappos
*Director of the United States Patent and Trademark Office*